United States Patent
Machida

(10) Patent No.: US 11,782,446 B2
(45) Date of Patent: Oct. 10, 2023

(54) ROUTE PLANNING APPARATUS, ROUTE PLANNING METHOD, AND COMPUTER-READABLE RECORDING MEDIUM

(71) Applicant: NEC Corporation, Tokyo (JP)

(72) Inventor: Manao Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 164 days.

(21) Appl. No.: 17/295,100

(22) PCT Filed: Nov. 22, 2018

(86) PCT No.: PCT/JP2018/043260
§ 371 (c)(1),
(2) Date: May 19, 2021

(87) PCT Pub. No.: WO2020/105189
PCT Pub. Date: May 28, 2020

(65) Prior Publication Data
US 2022/0019227 A1  Jan. 20, 2022

(51) Int. Cl.
*G05D 1/02* (2020.01)
*G05D 1/00* (2006.01)

(52) U.S. Cl.
CPC ......... *G05D 1/0214* (2013.01); *G05D 1/0289* (2013.01); *G05D 1/0088* (2013.01)

(58) Field of Classification Search
CPC .. G05D 1/0214; G05D 1/0289; G05D 1/0088; G05D 1/0274; G05D 1/0297; G05D 1/0217; G05D 2201/0216; G01C 21/20; G08G 1/096811; G08G 1/096827
See application file for complete search history.

(56) References Cited

U.S. PATENT DOCUMENTS

| | | |
|---|---|---|
| 5,283,739 A | 2/1994 | Summerville et al. |
| 5,625,559 A | 4/1997 | Egawa |
| 2012/0165982 A1* | 6/2012 | Kim ..................... B25J 9/162 |
| | | 700/262 |
| 2016/0033971 A1 | 2/2016 | Thomson |
| 2016/0169686 A1* | 6/2016 | Aas ...................... G06Q 50/02 |
| | | 701/408 |

FOREIGN PATENT DOCUMENTS

| | | | |
|---|---|---|---|
| JP | H07-219633 A | 8/1995 | |
| JP | 2006-268769 A | 10/2006 | |
| JP | 2008-134744 A | 6/2008 | |

(Continued)

OTHER PUBLICATIONS

International Search Report for PCT Application No. PCT/JP2018/043260, dated Feb. 26, 2019.

(Continued)

*Primary Examiner* — Rodney A Butler

(57) ABSTRACT

Provided is a route planning apparatus including a search unit 2 configured to search for a first route that connects each moving object and a lay-by area, when a deadlock is detected in a route plan of one or more moving objects 20, and a re-planning unit 3 configured to re-plan a second route from each moving object 20 to a target site such that the first routes which have been respectively found for the moving objects 20 do not collide with each other.

8 Claims, 15 Drawing Sheets

(56) References Cited

FOREIGN PATENT DOCUMENTS

| JP | 2010-176607 A | 8/2010 | |
|---|---|---|---|
| WO | 2002/023297 A1 | 3/2002 | |
| WO | WO-2006001412 A1 * | 1/2006 | ............. G01C 21/26 |

OTHER PUBLICATIONS

Hang Ma et al., "Lifelong Multi-Agent Path Finding for Online Pickup and Delivery Tasks", (online), AAMAS, May 11, 2017, (Accessed on Jun. 1, 2018).

English translation of Written opinion for PCT Application No. PCT/JP2018/043260, dated Feb. 26, 2019.

* cited by examiner

A

B

C

A

B

ROUTE PLANNING APPARATUS, ROUTE PLANNING METHOD, AND COMPUTER-READABLE RECORDING MEDIUM

This application is a National Stage Entry of PCT/JP2018/043260 filed on Nov. 22, 2018, the contents of all of which are incorporated herein by reference, in their entirety.

TECHNICAL FIELD

The present invention relates to a route planning apparatus and a route planning method for planning routes for moving objects, and further relates to a computer-readable recording medium that includes a program recorded thereon for realizing the apparatus and method.

BACKGROUND ART

Conventionally, Automated Guided Vehicles (AGVs) have been introduced in various plants to improve work efficiency, production efficiency, and the like. AGVs have been introduced in various logistics facilities as well to realize work efficiency improvement, quick delivery, and the like.

Non-patent document 1 discloses a technique for providing lay-by areas (end-points) to which a plurality of AGVs used in the above plants and the logistics facilities are moved to wait. The lay-by areas are provided in places where an AGV that is parked does not block the routes of other AGVs.

LIST OF RELATED ART DOCUMENTS

Patent Document

Non-Patent Document 1: Hang Ma, Jiaoyang Li, T. K. Satish Kumar, Sven Koenig, "Lifelong Multi-Agent Path Finding for Online Pickup and Delivery Tasks", (online), AAMAS, May 11, 2017, (Accessed on Jun. 1, 2018), <URL: http://www-scf.usc.edu/~hangma/pub/aamas17_slides.pdf>

SUMMARY OF INVENTION

Problems to be Solved by the Invention

However, merely by using the technique disclosed in Non-Patent Document 1, the plurality of AGVs operated in the above plants, logistics facilities, and the like may not be able to avoid a deadlock, when an accident occurs.

In particular, in the case where an accident such as a delay in conveyance, blocking of the routes by an obstacle (e.g., a person or an object), or a breakdown occurs, and the AGVs perform re-planning, a deadlock may occur. A deadlock is a state where the AGVs block each other's route and cannot move.

An example object of the invention is to provide a route planning apparatus, a route planning method, and a computer-readable recording medium that avoid a deadlock.

Means for Solving the Problems

In order to achieve the above example object, a route planning apparatus according to an example aspect of the invention includes:

a search unit configured to, search for a first route that connects each moving object and a lay-by area, when a deadlock is detected in a route plan of one or more moving objects; and a re-planning unit configured to re-plan a second route from each moving object to a target site such that the first routes which have been respectively found for the moving objects do not collide with each other.

Also, in order to achieve the above example object, a route planning method according to an example aspect of the invention includes:

(a) a step of searching for, a first route that connects each moving object and a lay-by area, when a deadlock is detected in a route plan of one or more moving objects; and (b) a step of re-planning a second route from each moving object to a target site such that the first routes which have been respectively found for the moving objects do not collide with each other.

Further, in order to achieve the above example object, a computer-readable recording medium according to one aspect of the invention includes a program recorded thereon, the program including instructions that cause a computer to carry out:

(a) a step of searching for, a first route that connects each moving object and a lay-by area, when a deadlock is detected in a route plan of one or more moving objects; and (b) a step of re-planning second routes from the moving objects to a target site such that the first routes which have been respectively found for the moving objects do not collide with each other.

Advantageous Effects of the Invention

As described above, according to the invention, a deadlock can be avoided.

EXAMPLE EMBODIMENTS (Example Embodiment)

Hereinafter, an example embodiment of the invention will be described with reference to FIGS. 1 to 15.

[Apparatus Configuration]

Figure 1:
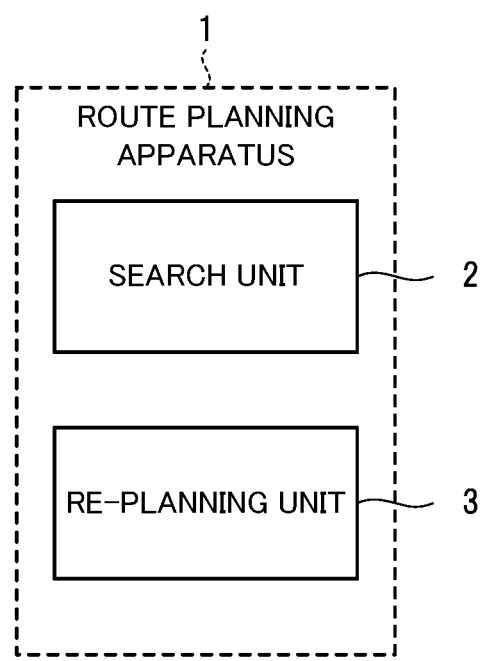
FIG. 1 is a diagram showing an example of a route planning apparatus.

First, a configuration of a route planning apparatus 1 according to the example embodiment will be described using FIG. 1. FIG. 1 is a diagram showing an example of a route planning apparatus.

The route planning apparatus 1 shown in FIG. 1 is an apparatus for planning the routes of moving objects and avoiding a deadlock. Also, as shown in FIG. 1, the route planning apparatus 1 includes a search unit 2 and a re-planning unit 3.

Of these, when a deadlock is detected in a route plan of one or more moving objects, the search unit 2 searches for routes (first routes) that connect the moving objects and lay-by areas (end points). The re-planning unit 3 re-plans routes (second routes) from the moving objects to the target sites (goal points) such that the first routes respectively found for the moving objects do not collide with each other.

In this manner, in the example embodiment, when a deadlock is detected, the moving objects can move to the lay-by areas according to the first routes, and routes for moving from the lay-by areas to the target sites can be re-planned, and thus even when a deadlock occurs, the moving objects can avoid the deadlock and move to the target site.

[System Configuration]

Figure 2:
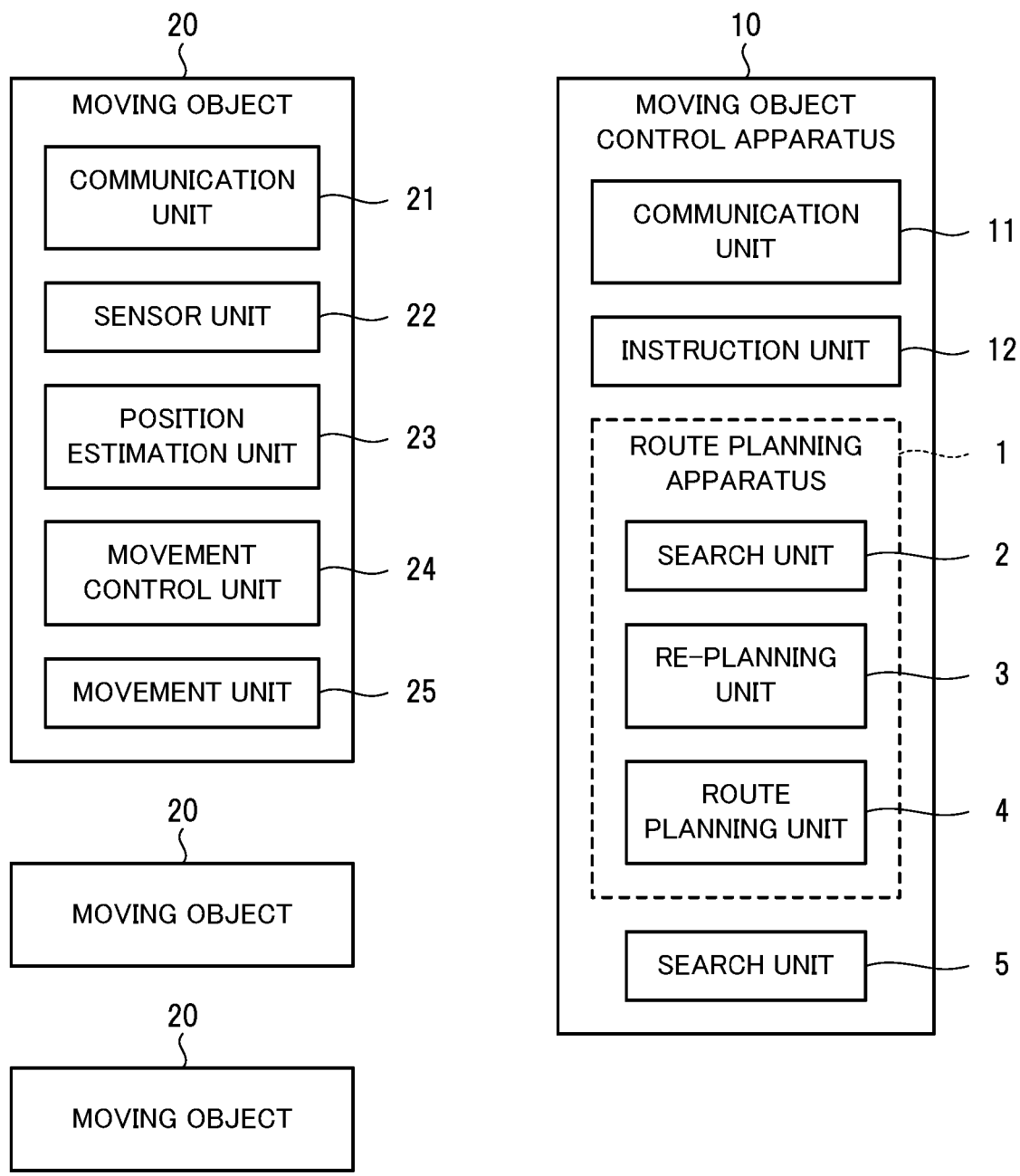
FIG. 2 is a diagram showing an example of a system (1) including the route planning apparatus.
Figure 3:
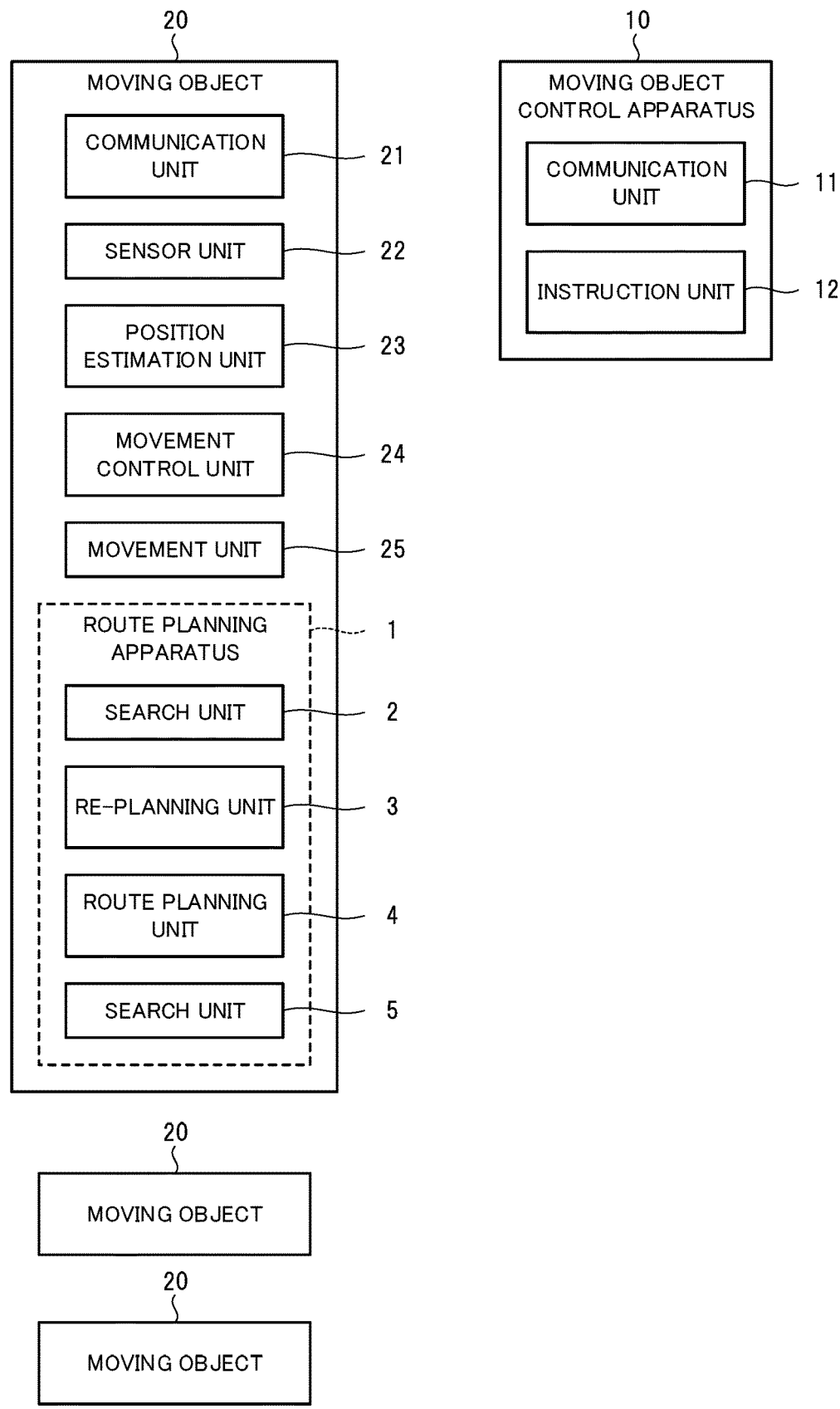
FIG. 3 is a diagram showing an example of a system (2) including the route planning apparatus.
Figure 4:
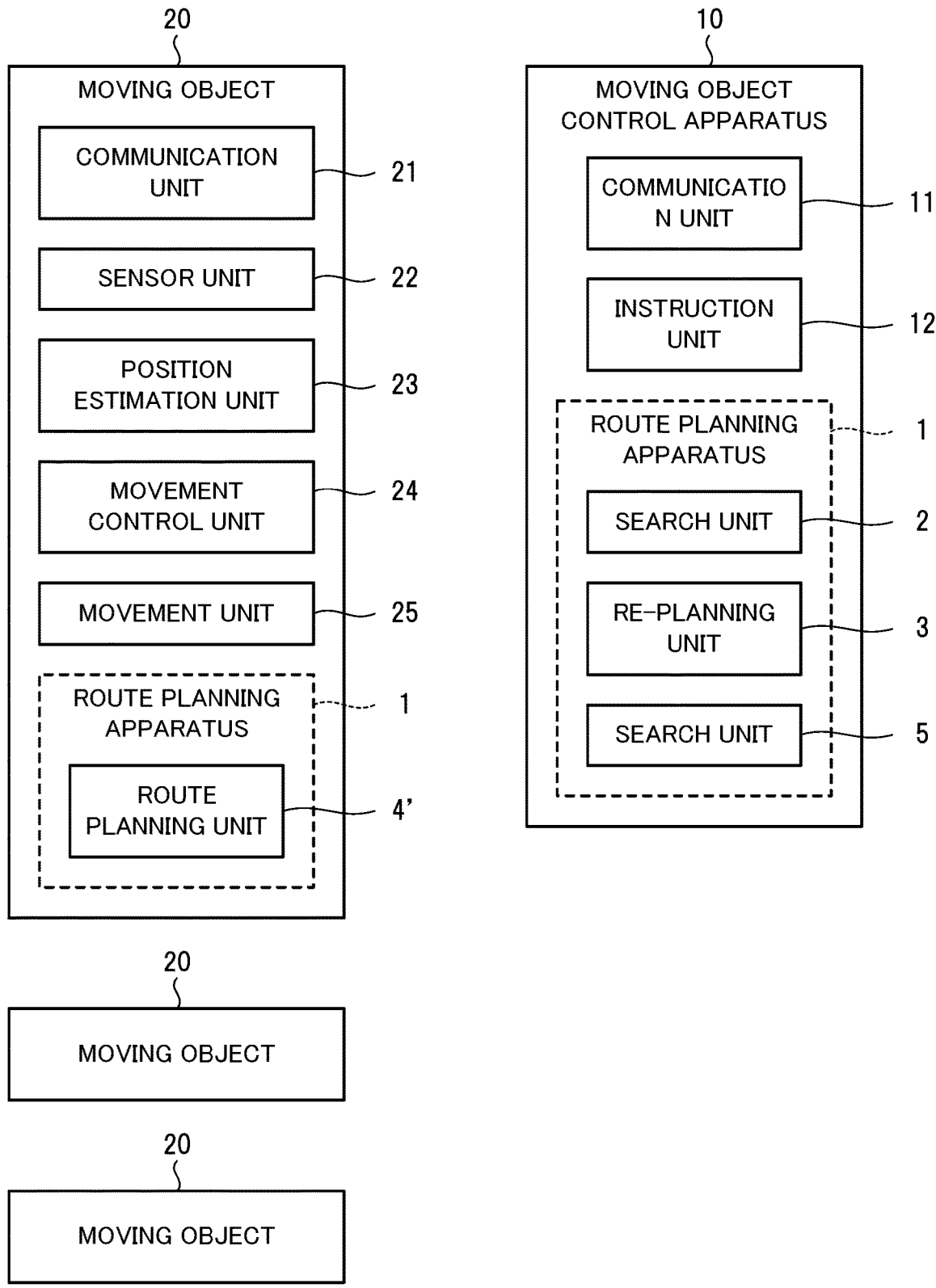
FIG. 4 is a diagram showing an example of a system (3) including the route planning apparatus.

Next, the configuration of the route planning apparatus 1 according to the example embodiment will be illustrated in more detail using FIGS. 2, 3, and 4. FIGS. 2, 3, and 4 are diagrams respectively showing an example of systems (1), (2), and (3) including the route planning apparatus. As respectively shown in FIGS. 2, 3, and 4, the systems in the example embodiment include the route planning apparatus 1 and a plurality of moving objects 20.

(1) Moving Object Control Apparatus Centered System

FIG. 2 shows a system in which the route planning apparatus 1 is provided in a moving object control apparatus 10. The moving object control apparatus 10 shown in FIG. 2 includes the route planning apparatus 1, a communication unit 11, and an instruction unit 12. Of these, the route planning apparatus 1 includes a route planning unit 4 and a detection unit 5 in addition to the search unit 2 and the re-planning unit 3. The moving objects 20 each include a communication unit 21, a sensor unit 22, a position estimation unit 23, a movement control unit 24, and a movement unit 25.

(2) Moving Object Centered System

FIG. 3 is a system in which the route planning apparatus 1 is provided in a moving object 20. In the example in FIG. 3, one of the moving objects 20 is set to the master, and the route planning apparatus 1 is provided in the moving object 20 serving as the master. The moving object control apparatus 10 shown in FIG. 3 includes the communication unit 11 and the instruction unit 12. The moving object 20 includes the route planning apparatus 1, the communication unit 21, the sensor unit 22, the position estimation unit 23, the movement control unit 24, and the movement unit 25. Of these, the route planning apparatus 1 includes the route planning unit 4 and the detection unit 5 in addition to the search unit 2 and the re-planning unit 3.

(3) Decentralized System

FIG. 4 shows a system in which the function of the route planning apparatus 1 is distributed between the moving object control apparatus 10 and the moving objects 20. The moving object control apparatus 10 shown in FIG. 4 includes the search unit 2, the re-planning unit 3, and the detection unit 5 of the route planning apparatus 1, in addition to the communication unit 11 and the instruction unit 12. Also, the moving objects 20 shown in FIG. 4 each include a route planning unit 4' of the route planning apparatus 1, in addition to the communication unit 21, the sensor unit 22, the position estimation unit 23, the movement control unit 24, and the movement unit 25. Note that the route planning unit 4' performs route planning for each moving object 20.

Note that a system configuration other than that of the systems (1), (2), and (3) described above may also be used. Specifically, the search unit 2, the re-planning unit 3, the route planning units 4 and 4', and the detection unit 5 may also be distributed between the moving object control apparatus 10 and the moving objects 20 in a configuration that is different from the systems (1), (2), and (3). In this case, the communication content between the communication unit 11 and the communication units 21 is changed in accordance with the configuration content of the moving object control apparatus 10 and the moving objects 20.

The moving object control apparatus will be described below.

The moving object control apparatus 10 controls the moving objects 20 such that the moving objects 20 move to the respective target sites. Note that the moving object control apparatus 10 is an information processing apparatus such as a server computer, for example.

The communication unit 11 communicates with the communication units 21 of the moving objects 20. Specifically, in the systems (1), (2), and (3), the communication unit 11 transmits, to the moving objects 20, instruction information indicating an instruction for moving the moving objects 20 and the like. Also, in the system (1), the communication unit 11 receives, from each moving object 20, information such as positional information indicating the position of the moving object 20 and the like. Also, in the system (3), the communication unit 11 receives, from each moving object 20, information such as the positional information indicating the position of the moving object 20, and route information indicating the route on which the moving object 20 moves.

The instruction unit 12 instructs the moving objects 20 to move. Specifically, the instruction unit 12 generates instruction information indicating an instruction for moving the moving objects 20 to the respective target sites.

The route planning apparatus 1 plans the routes for moving the moving objects 20 to the target sites and the lay-by areas. The route planning apparatus 1 also plans the routes for avoiding a deadlock.

Specifically, the route planning apparatus 1 generates the route information used when moving the moving objects 20 to the target sites and the lay-by areas using the positional information, map information, target site information indicating the target site which each moving object 20 is to reach, and lay-by area information indicating the lay-by area to which each moving object 20 moves and waits.

The map information is information indicating an arrangement plan of the target facility, and the like. The map information includes the routes on which the moving objects 20 are to move, the target sites which the moving objects 20 are to reach, the lay-by areas to which the moving objects 20 are to move and wait, and the like in a plant, logistics facility, or the like. Also, for example, a grid map is favorably used as the map information. Further, the map information is stored in a storage unit (not shown) provided in the moving object control apparatus 10, the moving objects 20, or other locations.

The moving objects will be described below.

The moving objects 20 obtain the instruction information from the moving object control apparatus 10 and move to the respective target sites. Specifically, the moving objects 20 are conceivably AGVs, self-driving vehicles, self-flying vehicles, self-sailing ships, robots, and the like.

The communication unit 21 communicates with the communication unit 11 of the moving object control apparatus 10. Specifically, in the system (1), the communication unit 21 transmits the positional information and the like to the moving object control apparatus 10. Also, in the system (3), the communication unit 21 transmits the positional information, the route information and the like to the moving object control apparatus 10. Also, in the systems (1), (2), and (3), the communication unit 21 receives, from the moving object control apparatus 10, the instruction information indicating the instruction for moving the moving object 20 and the like.

The sensor unit 22 is a sensor or the like for detecting the state of the moving object 20, target objects (e.g., a tray, a shelf, etc.), signs assisting movement of the moving object 20, actual obstacles on the routes, and the like. Specifically, the sensor unit 22 includes one or more devices such as a radar, an ultrasonic sensor, an image capturing apparatus, a gyroscope, an encoder, and a GPS (Global Positioning System).

The position estimation unit 23 estimates the self-position of the moving object 20. Specifically, the position estimation unit 23 obtains measurement information indicating the measurement result of the sensor unit 22, and estimates the self-position of the moving object 20 based on the obtained measurement information.

The movement control unit 24 controls the movement unit 25 that is provided in the moving object 20 and for moving the moving object 20. Specifically, the movement control unit 24 controls the movement unit 25 using the above route information to move the moving object 20 to the target site and the lay-by area.

The movement unit 25 is a device for moving the moving object 20. Specifically, if the moving object 20 is an electric vehicle, the movement unit 25 is a means such as a motor, wheels, a battery, and the like that are necessary for moving the electric vehicle.

The route planning apparatus will be described below.

In the systems (1) and (2), the route planning unit 4 generates the route information for moving the moving objects 20 to the respective target sites corresponding to the moving objects 20. Specifically, the route planning unit 4 uses the positional information, the map information, the target site information, and the lay-by area information to generate the route information used when moving the moving objects 20 to the corresponding target sites.

In the system (3), the route planning unit 4' generates the route information for moving the moving object 20 in which the route planning unit 4' is provided to the target site corresponding to that moving object 20. Specifically, the route planning unit 4' uses the positional information, the map information, the target site information, and the lay-by area information to generate the route information used when moving the moving object 20 in which the route planning unit 4' is provided to the corresponding target site.

Figure 5:
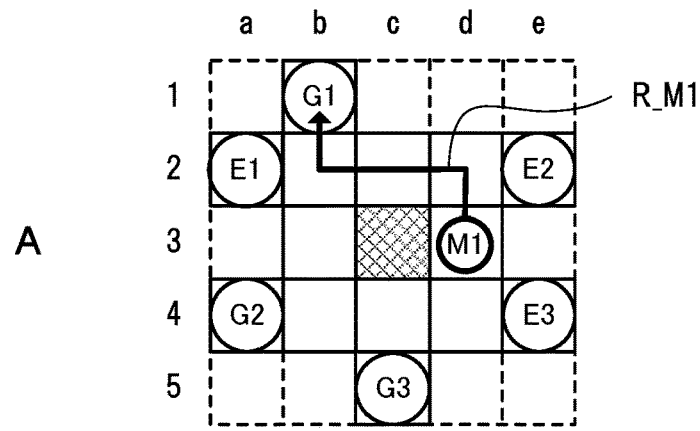
FIG. 5 shows diagrams illustrating routes in a case where moving objects move according to a route plan.
Figure 5:
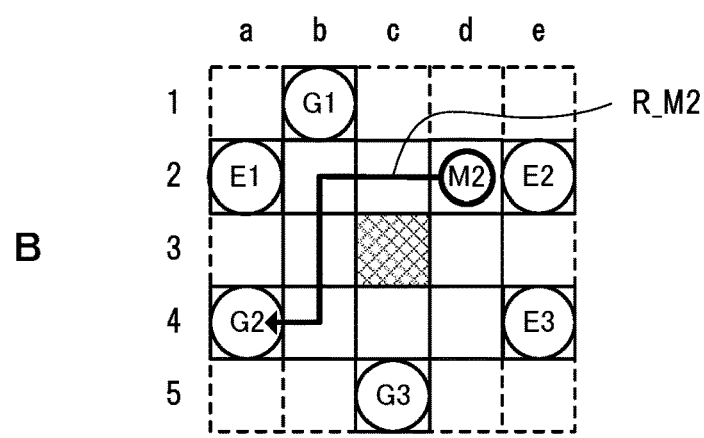
Figure 5:
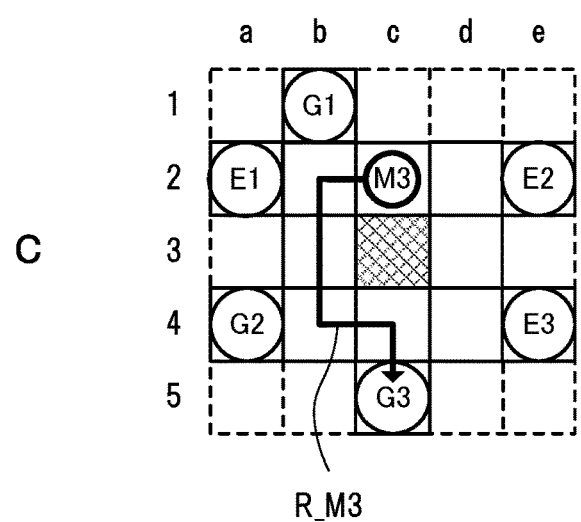

FIG. 5 shows diagrams illustrating the routes in the case where the moving objects move according to the route plan. In the grid maps in FIG. 5, the moving objects 20 (M1), (M2), and (M3), the target sites (G1), (G2), and (G3), the lay-by areas (E1), (E2), and (E3), and movement prohibited areas (hatched regions), and the routes (arrow lines) are shown in the grid ranges (hereinafter called "grids").

FIG. 5A shows a route R_M1 on which the moving object 20 (M1) moves toward the target site (G1). FIG. 5B shows a route R_M2 on which the moving object 20 (M2) moves toward the target site (G2). FIG. 5C shows a route R_M3 on which the moving object 20 (M3) moves toward the target site (G3).

The route information indicating the routes R_M1, R_M2, and R_M3 may be represented by Expression 1, for example.

$$\text{Route } R\_M1 = \{(d3,0), (d2,1), (c2,2), (b2,3), (b1,4)\}$$

$$\text{Route } R\_M2 = \{(d2,0), (c2,1), (b2,2), (b3,3), (b4,4), (a4,5)\}$$

$$\text{Route } R\_M3 = \{(c2,0), (b2,1), (b3,2), (b4,3), (c4,4), (c5,5)\} \quad \text{(Expression 1)}$$

Left term in the parenthesis: information indicating the grid position

Right term in the parenthesis: information indicating time required for the moving object 20 to move to the next grid In the systems (1), (2), and (3), the detection unit 5 uses the map information and the positional information to detect a deadlock. Specifically, if the plurality of moving objects 20 have been stationary in a predetermined region for a predetermined time period, the detection unit 5 determines that the moving objects 20 are in a deadlock.

Upon detecting that one or more moving objects 20 are in a deadlock in the route plan of the moving objects 20, the search unit 2 searches for routes that connect the moving objects 20 and the lay-by areas using methods of (A), (B), or (C) that will be described later. Specifically, (A) the search unit 2 selects the moving object 20 located at the shortest distance from the lay-by area, and searches for a route (first route) using the selected moving object 20 and the lay-by area.

Alternatively, (B) the search unit 2 selects an unselected lay-by area that has not been selected by another moving object 20 and is located at the shortest distance from the moving object 20, generates a route from the moving object 20 to the selected lay-by area, and searches for a route (first route) using the selected lay-by area and the moving object 20 that is located on the route and is closest to the selected lay-by area. Alternatively, (C) the search unit 2 searches for a route (first route) for each moving object 20 using minimum cost flow processing.

The re-planning unit 3 re-plans, for each moving object 20, the route (second route) from the moving object 20 to the target site such that the found routes (first routes) do not collide with each other. Specifically, after detecting that all the moving objects 20 have planned the first routes, the re-planning unit 3 re-plans, for each moving object 20, the route from the moving object 20 to the target site, and updates the previous route with the re-planned route.

Deadlock avoidance through the method of (A) will be described below.

Figure 6:
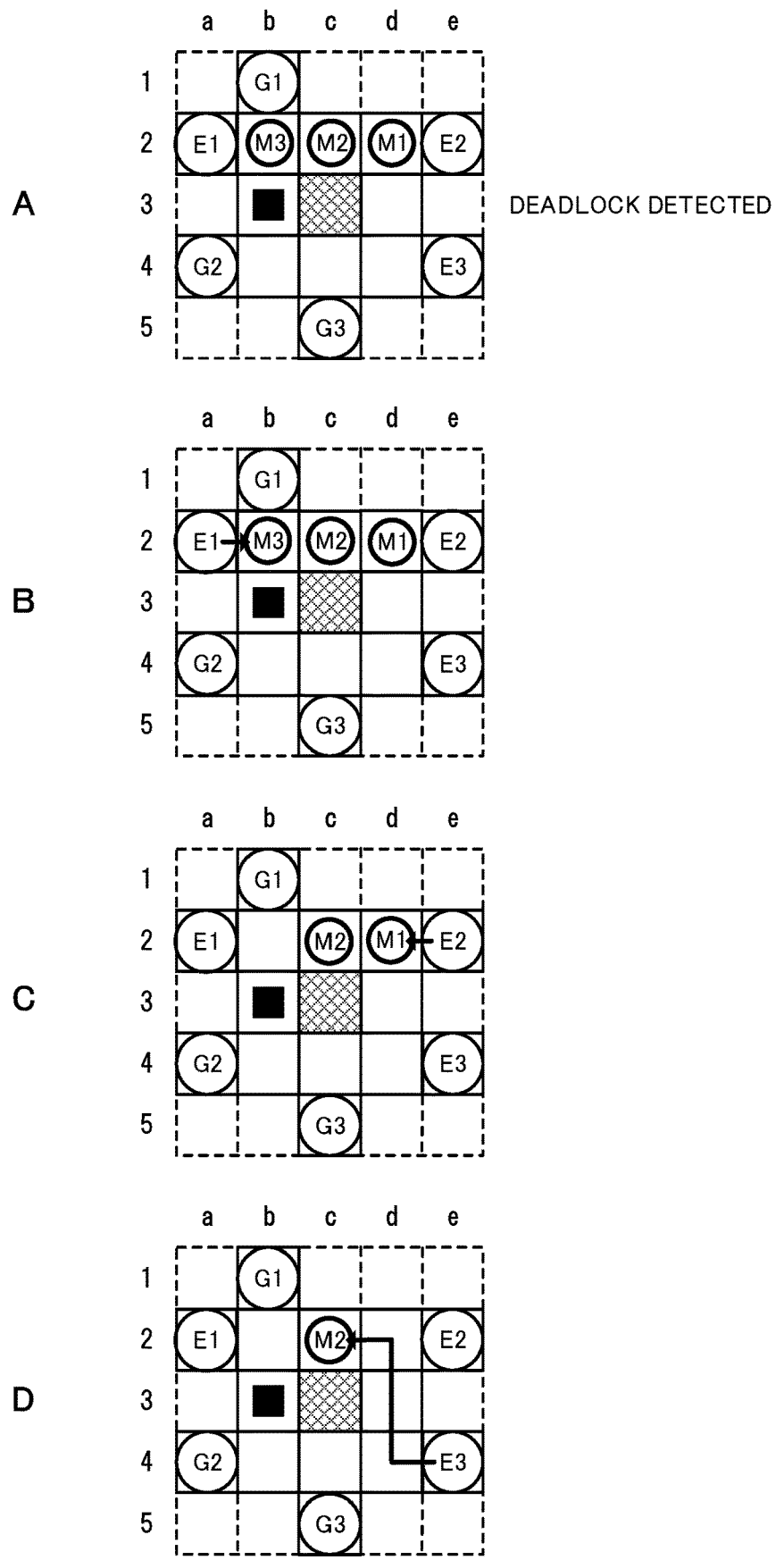
FIG. 6 shows diagrams illustrating routes in a case where the moving objects cannot move according to the route plan.

For example, the A* (A-Star) algorithm is conceivably used as the method of (A). FIG. 6 shows diagrams illustrating the routes in the case where the moving objects cannot move according to the route plan. FIG. 6A shows that, since an obstacle (black square) is placed in the grid b3, the respective routes R_M1, R_M2, and R_M3 of the moving objects 20 (M1), (M2), and (M3) shown in FIG. 5 are blocked. That is, FIG. 6A shows the state where the moving objects 20 (M1), (M2), and (M3) cannot obtain the routes to reach the respective target sites (G1), (G2), and (G3), and are in a deadlock.

If the moving objects 20 (M2) and (M3) do not move, the moving object 20 (M1) cannot reach the target site (G1). Also, if the moving object 20 (M1) does not move, the moving object 20 (M2) cannot reach the target site (G2). Further, if the moving objects 20 (M1) and (M2) do not move, the moving object 20 (M3) cannot reach the target site (G3).

Upon detecting the deadlock, the search unit 2 selects the lay-by areas in a predetermined order, and searches for the moving object 20 located in the grid closest to the selected lay-by area.

Specifically, if the order for selecting the lay-by areas is set to (E1), (E2), and (E3), as shown in FIG. 6B, the search unit 2 first selects the moving object 20 (M3) located in the grid closest to the lay-by area (E1). Then, the search unit 2 stores a route R_E1 (arrow line in FIG. 6B) that connects the lay-by area (E1) and the moving object 20 (M3), in the storage unit.

Next, as shown in FIG. 6C, the search unit 2 excludes the selected moving object 20 (M3), selects the moving object 20 (M1) located in the grid closest to the lay-by area (E2), and stores a route R_E2 (arrow line in FIG. 6C) that connects the lay-by area (E2) and the moving object 20 (M1), in the storage unit.

Next, as shown in FIG. 6(D), the search unit 2 excludes the selected moving objects (M3) and (M1), selects the moving object 20 (M2) located in the grid closest to the lay-by area (E3), and stores a route R_E3 (arrow line in FIG. 4D) that connects the lay-by area (E3) to the moving object 20 (M2) in the storage unit. For example, the search unit 2 stores the routes R_E1, R_E2, and R_E3 as represented by Expression 2 in the storage unit.

Route $R\_E1=\{(b2,0), (a2,1), (a2,2) \ldots \}$

Route $R\_E2=\{(d2,0), (e2,1), (e3,2) \ldots \}$

Route $R\_E3=\{(c2,0), (d2,1), (d3,2), (d4,3), (e4,4)\}$ (Expression 2)

Note that, the above storage unit may be provided in the moving object control apparatus 10 or the moving objects 20, or a place other than the moving object control apparatus 10 and the moving objects 20. Also, the order for selecting the lay-by areas is not limited to the order described above. Further, the search unit 2 searches for routes such that the routes R_E1, R_E2, and R_E3 that connect the moving objects 20 and the lay-by areas do not collide with each other.

Figure 7:
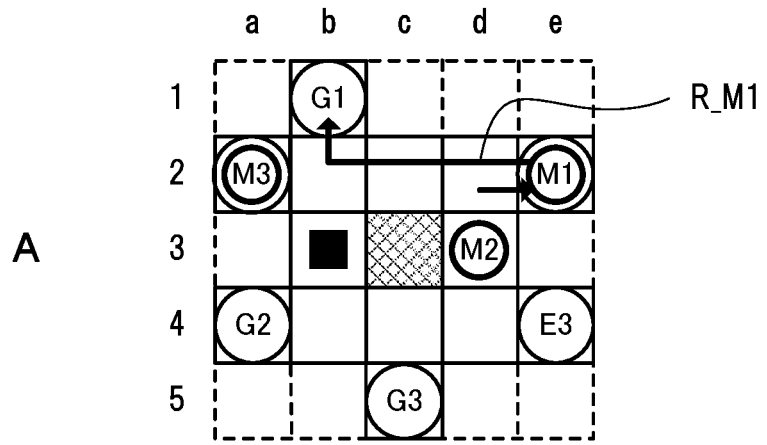
FIG. 7 shows diagrams illustrating re-planned routes.
Figure 7:
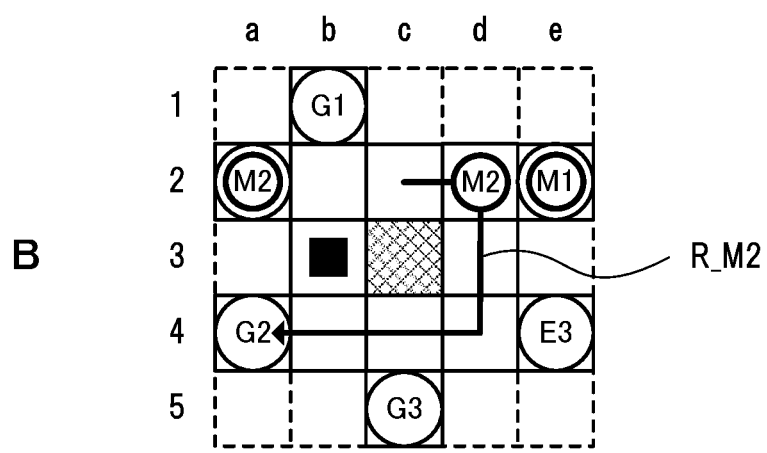
Figure 7:
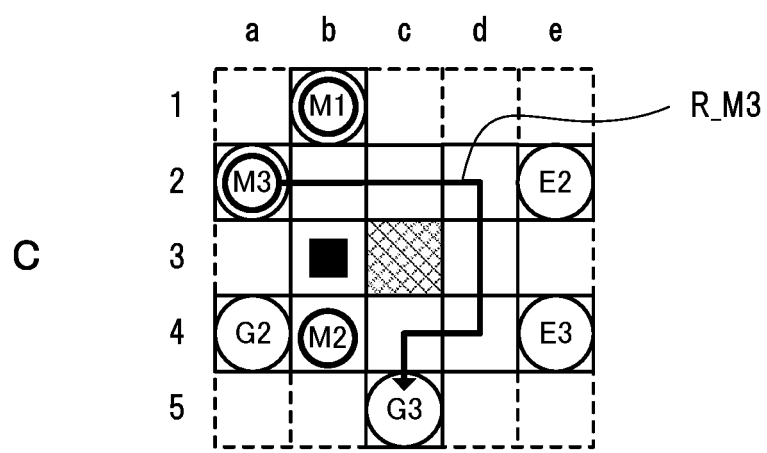

Subsequently, the re-planning unit 3 selects the moving objects 20 in a predetermined order, and re-plans the routes from the moving objects 20 to the target sites such that the routes found using the search unit 2 do not collide with each other. The re-planning unit 3 will be described in detail below using FIG. 7. FIG. 7 shows diagrams illustrating the re-planned routes.

Specifically, if the order in which to select the moving objects 20 is set to (M1), (M2), and (M3), the re-planning unit 3 first re-plans the route from the moving object 20 (M1) to the target site (G1) in the state at the time (0) shown in FIG. 6A.

For example, at the time (1), as shown in FIG. 7A, the moving object 20 (M1) is moved from the grid d2 to the lay-by area (E2) according to Expression 2. In this case, according to Expression 2, the moving object 20 (M2) is moved to the grid d2 in order to be moved to the lay-by area (E3). The moving object 20 (M3) is moved to the lay-by area (E1) according to Expression 2.

At the time (2), the moving object 20 (M1) is moved from the lay-by area (E2) to the grid d2. In this case, the moving object 20 (M2) is moved from the grid d2 to the grid d3, and the moving object 20 (M3) is kept in the lay-by area (E1).

The moving object 20 (M1) is moved to the grids c2, b2, and b1 at the respective times (3), (4), and (5). In other words, the moving object 20 (M1) reaches the target site (G1) at the time (5). In this case, the moving object 20 (M2) is moved to the grids d4, c4, and b4 at the respective times (3), (4), and (5). The moving object 20 (M3) is kept in the lay-by area (E1) during the times (3) to (4).

In this manner, as shown in FIG. 7A, the re-planning unit 3 moves the moving object 20 (M1) to the lay-by area (E2), and thereafter re-plans the route from the lay-by area (E2) to the target site (G1), and updates the route R_M1 with the re-planned route. The re-planning unit 3 stores the route R_M1 as represented by Expression 3 in the storage unit.

Route $R\_M1=\{(d2,0), (e2,1), (b2,2), (c2,3), (b1,4), (a1,5)\}$ (Expression 3)

Subsequently, the re-planning unit 3 selects the moving object 20 (M2), and re-plans the route from the moving object 20 (M2) to the target site (G2) according to Expression 2 from the state of the time (0) in FIG. 6A.

For example, as shown in FIG. 6D, the moving object 20 (M2) is moved from the grid c2 to the lay-by area (E3) according to Expression 2. At the time (1), in order to move the moving object 20 (M1) to the lay-by area (E2), the moving object 20 (M2) can be moved from the grid c2 to the grid d2.

The moving object 20 (M2) is moved to the grids d3, d4, and e4 at the respective times (2), (3), and (4). In other words, the moving object 20 (M2) is moved to the lay-by area (E3) to wait. Next, the moving object 20 (M2) is moved to the grids d4, c4, b4, and a4 in this order at the respective times (5), (6), (7), and (8) and is caused to reach the target site (G2).

Note that the moving object 20 (M2) need not necessarily be moved to the lay-by area (E3) to wait. In other words, if the route of the moving object 20 (M2) does not collide with the routes of the moving objects 20 (M1) and (M3), the moving object 20 (M2) may also be directly moved to the target site (G2) without being moved to the lay-by area (E3).

In this manner, as shown in FIG. 7B, the re-planning unit 3 re-plans the route from the moving object 20 (M2) to the target site (G2), and updates the route R_M2 with the re-planned route. The re-planning unit 3 stores the route R_M2 as represented by Expression 4 in the storage unit.

Route $R\_M2=\{(c2,0), (d2,1), (d3,2), (d4,3), (c4,4), (b4,5), (a4,6)\}$ (Expression 4)

Subsequently, the re-planning unit 3 selects the moving object 20 (M3), and re-plans the route from the moving object 20 (M3) to the target site (G3) according to Expression 2 from the state of the time (0) in FIG. 6A.

At the time (1), as shown in FIG. 7C, the moving object 20 (M3) is moved from the grid b2 to the lay-by area (E1) according to Expression 2. Next, the moving object 20 (M3) is kept in the lay-by area (E1) during the times (2) to (4).

At the time (5), since the moving object 20 (M1) has reached the target site (G1), the moving object 20 (M3) is moved to the grid b2. Thereafter, from the time (6) to the time (11), the moving object 20 (M3) is moved to the grids c2, d2, d3, d4, c4, and c5, and is caused to reach the target site (G3).

In this manner, as shown in FIG. 7C, the re-planning unit 3 re-plans the route from the moving object 20 (M3) to the target site (G3), and updates the route R_M3 with the re-planned route. The re-planning unit 3 stores the route R_M3 as represented by Expression 5 in the storage unit.

$$\text{Route } R\_M3=\{(b2,0), (a2,1), (a2,2), (a2,3), (a2,4),$$
$$(b2,5), (c2,6), (d2,7), (d3,8), (d4,9), (c4,10),$$
$$(c5,11)\} \quad \text{(Expression 5)}$$

Deadlock avoidance through the method (B) will be described below.

Figure 8:
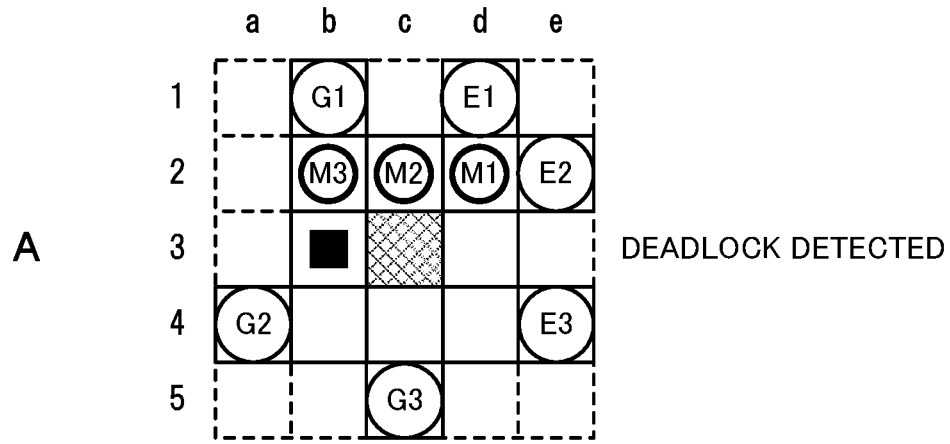
FIG. 8 shows diagrams illustrating routes in a case where the moving objects cannot move according to the route plan.
Figure 8:
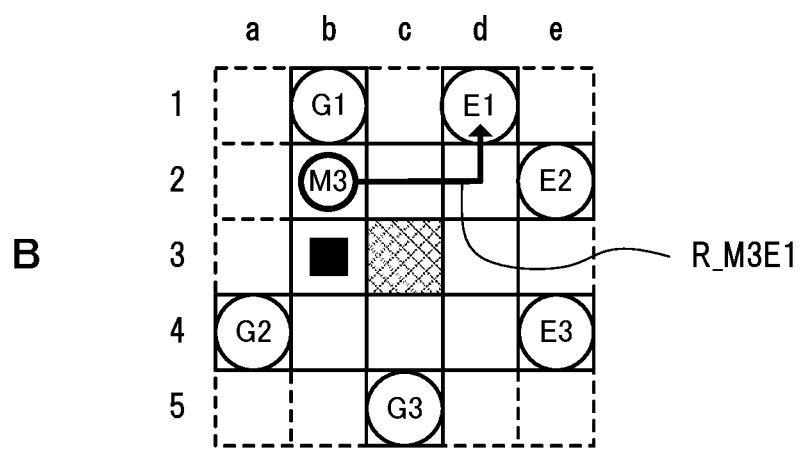
Figure 8:
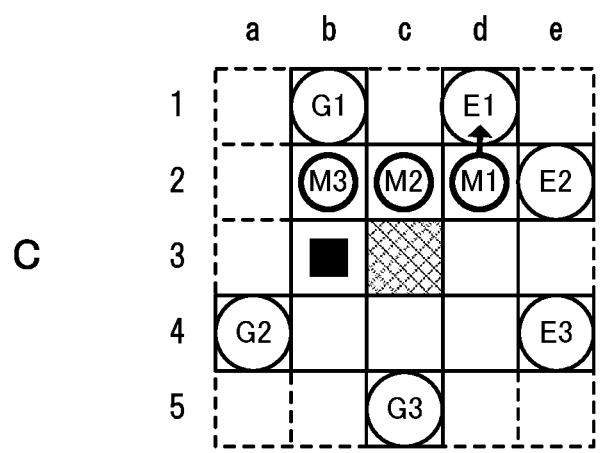
Figure 9:
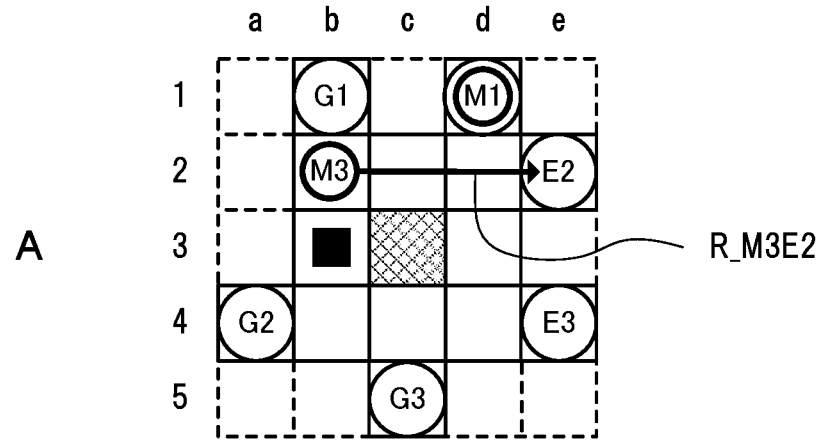
FIG. 9 is diagrams illustrating a route in a case where the moving objects cannot move according to the route plan.
Figure 9:
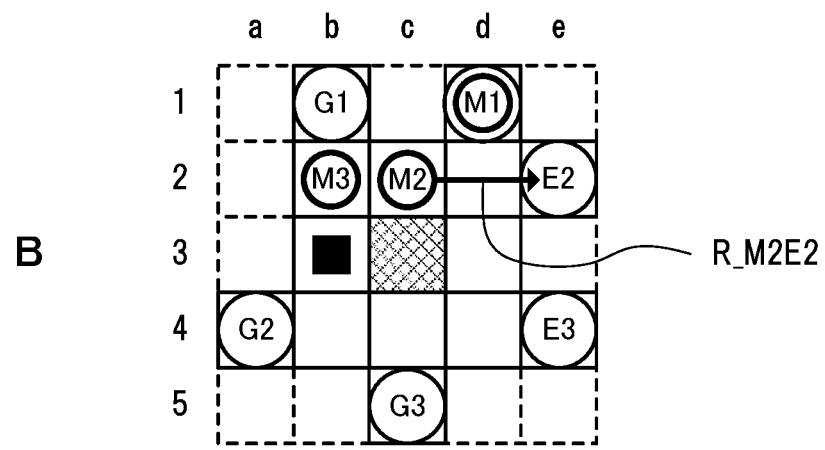
Figure 9:
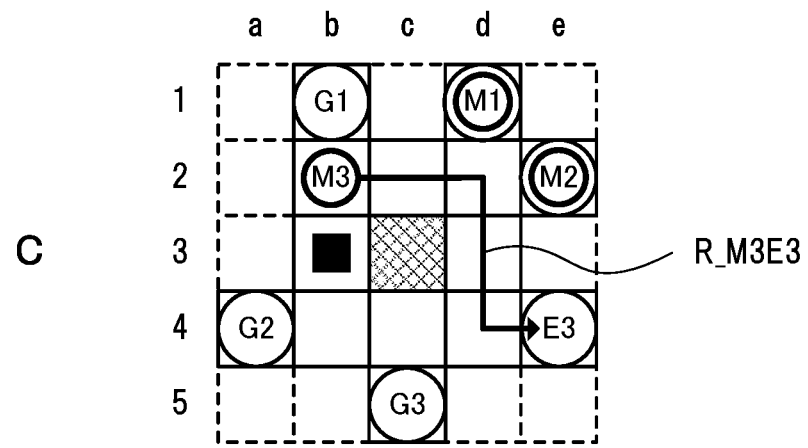
Figure 10:
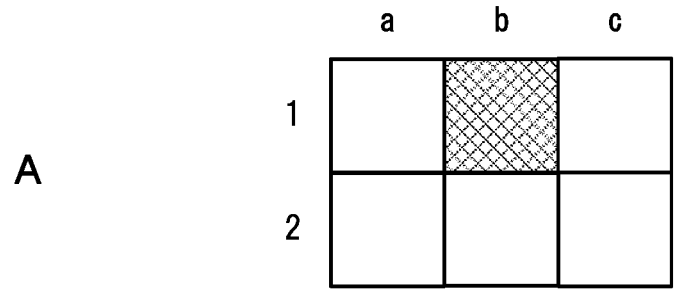
FIG. 10 is a diagram illustrating how a graph is created from a grid map.
Figure 10:
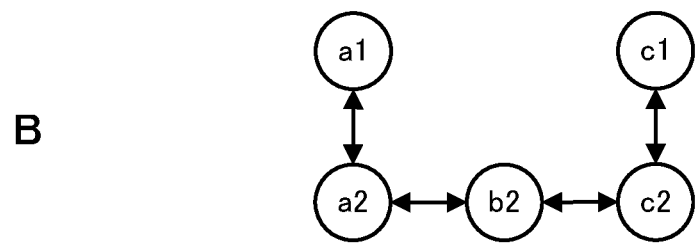
Figure 10:
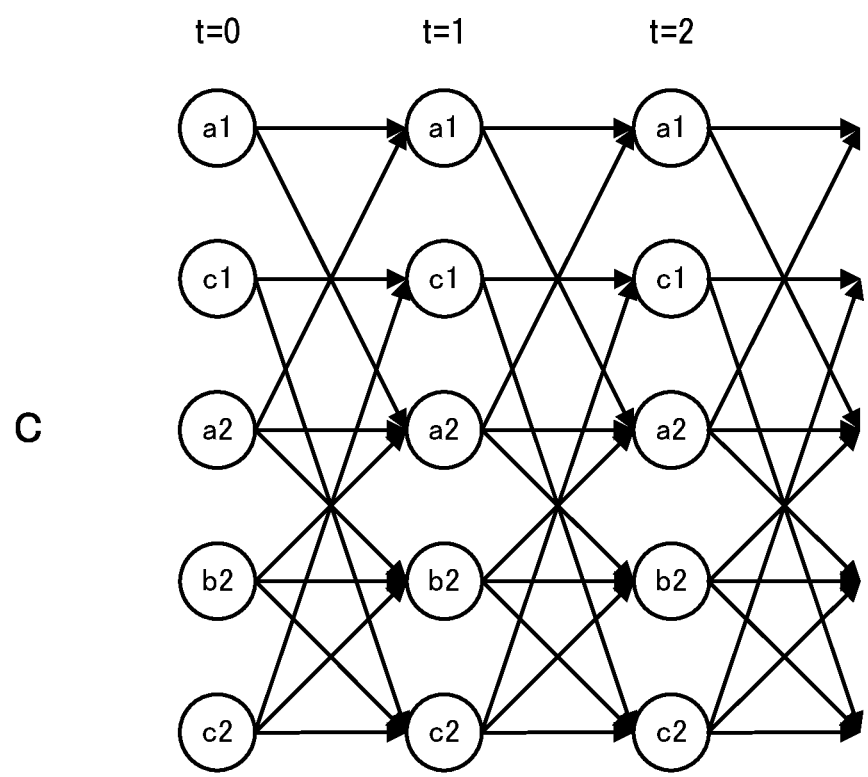
Figure 11:
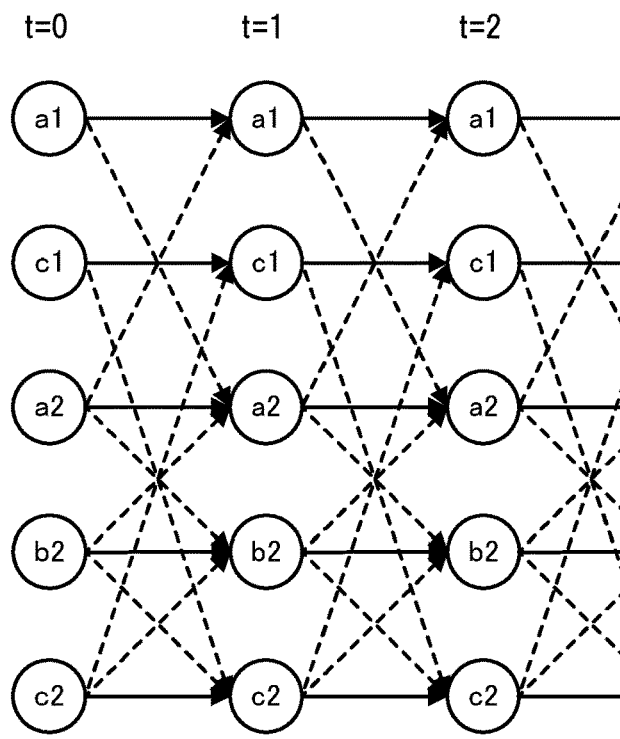
FIG. 11 is a diagram illustrating how the graph is created from the grid map.
Figure 11:
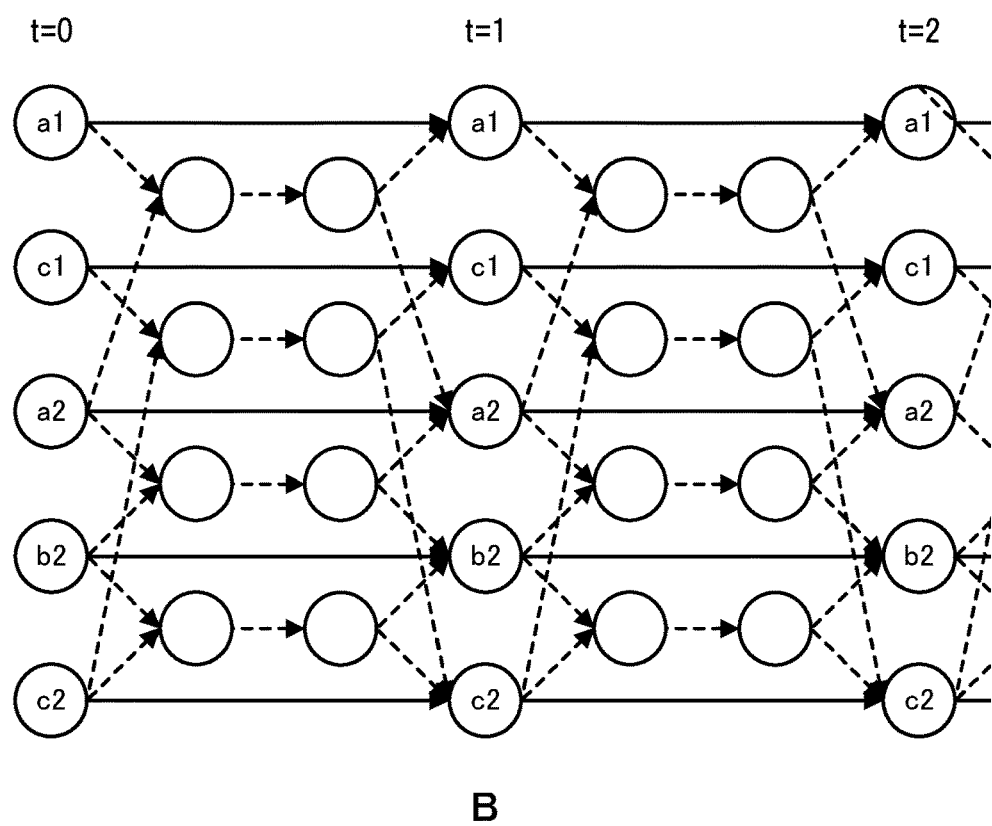
Figure 12:
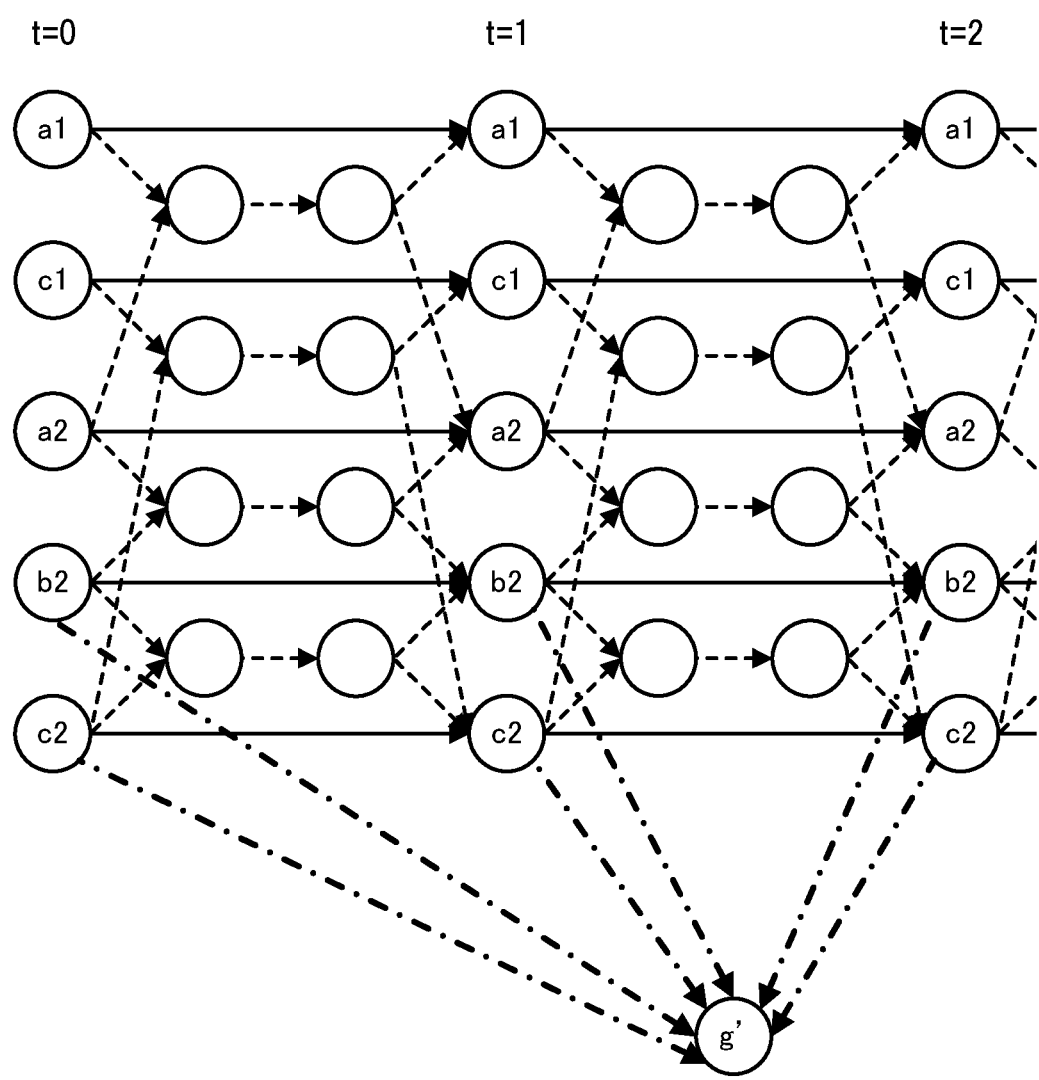
FIG. 12 is a diagram illustrating how the graph is created from the grid map.

For example, an algorithm described below is conceivably used as the method (B). FIGS. 8 and 9 show diagrams illustrating the routes in the case where the moving objects cannot move according to the route plan. FIG. 8A shows the state where, since an obstacle (black square) is placed in the grid b3, the routes of the moving objects 20 (M1), (M2), and (M3) are blocked.

In the grid maps in FIG. 8, the moving objects 20 (M1), (M2), and (M3), the lay-by areas (E1), (E2), and (E3), the target sites (G1), (G2), and (G3), the movement prohibition areas (hatched areas), and the routes (arrow lines) are shown in the grids.

FIG. 8A shows the state where, since the obstacle (black square) is placed in the grid b3, the routes of the moving objects 20 (M1), (M2), and (M3) shown in FIG. 8(A) are blocked. That is, FIG. 8A shows the state where the routes of the moving objects 20 (M1), (M2), and (M3) to reach the respective target sites (G1), (G2), and (G3) cannot be obtained, and the moving objects 20 (M1), (M2), and (M3) are in the deadlock.

If the moving objects 20 (M2) and (M3) do not move, the moving object 20 (M1) cannot reach the target site (G1). If the moving object 20 (M1) does not move, the moving object 20 (M2) cannot reach the target site (G2). If the moving objects 20 (M1) and (M2) do not move, the moving object 20 (M3) cannot reach the target site (G3).

Upon detecting the deadlock, the search unit 2 selects an unselected lay-by area that has not been selected by another moving object 20 and is located at the shortest distance from the moving object 20. Subsequently, the search unit 2 generates the route from the moving object 20 to the selected lay-by area, and searches for the route using the selected lay-by area and the moving object 20 that is located on the route and is closest to the selected lay-by area.

Specifically, the search unit 2 first selects the moving object 20 to serve as a base point. In the example in FIG. 8B, the moving object 20 (M3) is set to the base point. Subsequently, the search unit 2 selects the lay-by area (E1) located at the shortest distance from the moving object 20 (M3). Thereafter, the search unit 2 generates a route R_M3E1 that connects the moving object 20 (M3) and the selected lay-by area (E1) as represented by Expression 6.

$$\text{Route } M3E1=\{(b2,0), (c2,1), (d2,2), (d1,3)\} \quad \text{(Expression 6)}$$

Subsequently, after selecting the moving objects 20 (M1) and (M2) that are present on the route R_M3E1, the search unit 2 further selects the lay-by area (E1) that is closest to the moving object 20 (M1). Then, as shown in FIG. 8C, the search unit 2 generates a route R_M1E1 that connects the moving object 20 (M1) and the lay-by area (E1) and stores the generated route in the storage unit. The search unit 2 stores the route R_M1E1 as represented by Expression 7 in the storage unit.

$$\text{Route } M1E1=\{(d2,0), (d1,1)\} \quad \text{(Expression 7)}$$

Subsequently, the search unit 2 excludes the lay-by area (E1), and, as shown in FIG. 9A, selects the lay-by area (E2) located at the shortest distance from the moving object 20 (M3). Thereafter, the search unit 2 generates a route R_M3E2 that connects the moving object 20 (M3) and the selected lay-by area (E2) as represented by Expression 8.

$$\text{Route } M3E2=\{(b2,0), (c2,1), (d2,2), (e1,3)\} \quad \text{(Expression 8)}$$

The search unit 2 excludes the moving object 20 (M1), selects the moving object 20 (M2) that is present on the route R_M3E2, and thereafter, further selects the lay-by area (E2) that is closest to the moving object 20 (M2). Then, as shown in FIG. 9B, the search unit 2 generates a route R_M2E2 that connects the moving object 20 (M2) and the lay-by area (E2), and stores the route R_M2E2 in the storage unit. The search unit 2 stores the route R_M2E2 as represented by Expression 9 in the storage unit.

$$\text{Route } M2E2=\{(c2,0), (d2,1), (e2,1)\} \quad \text{(Expression 9)}$$

Subsequently, the search unit 2 excludes the lay-by areas (E1) and (E2) and, as shown in FIG. 9C, selects the lay-by area (E3) located at the shortest distance from the moving object 20 (M3). Thereafter, the search unit 2 generates a route R_M3E3 that connects the moving object 20 (M3) and the selected lay-by area (E3) as represented by Expression 10.

$$\text{Route } M3E3=\{(b2,0), (c2,1), (d2,2), (d3,3), (d4,4),$$
$$(e4,5)\} \quad \text{(Expression 10)}$$

Next, when all the moving objects 20 (M1), (M2), and (M3) have been moved to the lay-by areas to wait, the search unit 2 removes the authority of the moving object 20 (M3) as the base point. Note that, if there is another moving object 20 other than the moving objects 20 (M1), (M2), and (M3), the search unit 2 searches for the route to the lay-by area using the other moving object 20 as the base point.

Subsequently, the re-planning unit 3 selects the moving objects 20 in a predetermined order, and re-plans the routes from the moving objects 20 to the target sites such that the routes found for using the search unit 2 do not collide with each other.

Deadlock avoidance through the method (C) will be described below.

It is conceivable that minimum cost flow processing is used as the method (C), for example. Upon detecting a deadlock, the search unit 2 searches for a route, for each moving object 20, from the moving object 20 to the selected lay-by area using the minimum cost flow processing.

Specifically, in the minimum cost flow processing, a graph T, a demand-and-supply b, a capacity u, and a cost c are input, and a flow for which the total cost that satisfies the demand-and-supply is minimized is output. A graph is generated from a grid map as shown in FIGS. 10, 11, 12, and 13, for example. FIGS. 10, 11, 12, and 13 are diagrams illustrating how a graph is generated from a grid map.

The case where a graph is generated from the grid map shown in FIG. 10A will be described below. First, the relationship between the grids in FIG. 10A can be represented by the graph shown in FIG. 10B. The nodes corresponding to the grids in FIG. 10B represent the positions of the grids, and the arrow lines represent the adjacent relationship of the grids.

Next, as shown in FIG. 10C, the nodes (a1), (c1), (a2), (b2), and (c2) are arranged for each time t=0, 1, and 2, and the same nodes and the adjacent nodes at the subsequent times are connected by edges (arrow lines). Next, the intersecting edges (dotted arrow lines) shown in FIG. 11A are converted into the graph shown in FIG. 11B using time expanded graph processing. Here, the time t=0, 1, and 2 is information indicating time period required for the moving object 20 to move to the next grid.

Subsequently, the graph T is generated by adding the nodes next to the lay-by areas to the graph. In the example in FIG. 12, the nodes b2 and c2 are set to the lay-by areas, and the node (g'|) adjacent to the nodes (b2) and (c2) are added. Thereafter, the nodes (b2) and (c2) at the time t=0, 1, and 2 and the node (g') are connected to each other by edges (dashed-dotted arrow lines).

Next, the demand-and-supply b for which the demand of the node (g') is set such that the sum of the demand and supply is 0 is obtained, with the node corresponding to the position of the moving object 20 at the time t=0 as the node of supply 1, and the nodes other than the node (g') as the nodes of with supply 0. Also, the capacity u for which the capacity of each edge is 1, and the cost c for which the costs of the edges that are input to nodes (a1), (c1), (a2), (b2), and (c2) at the time t=0 are 1 and the remaining costs are 0 are obtained.

Next, the graph T, the demand-and-supply b, the capacity u, and the cost c are input to the minimum cost flow processing, and the routes are extracted from a flow f that is output.

Figure 13:
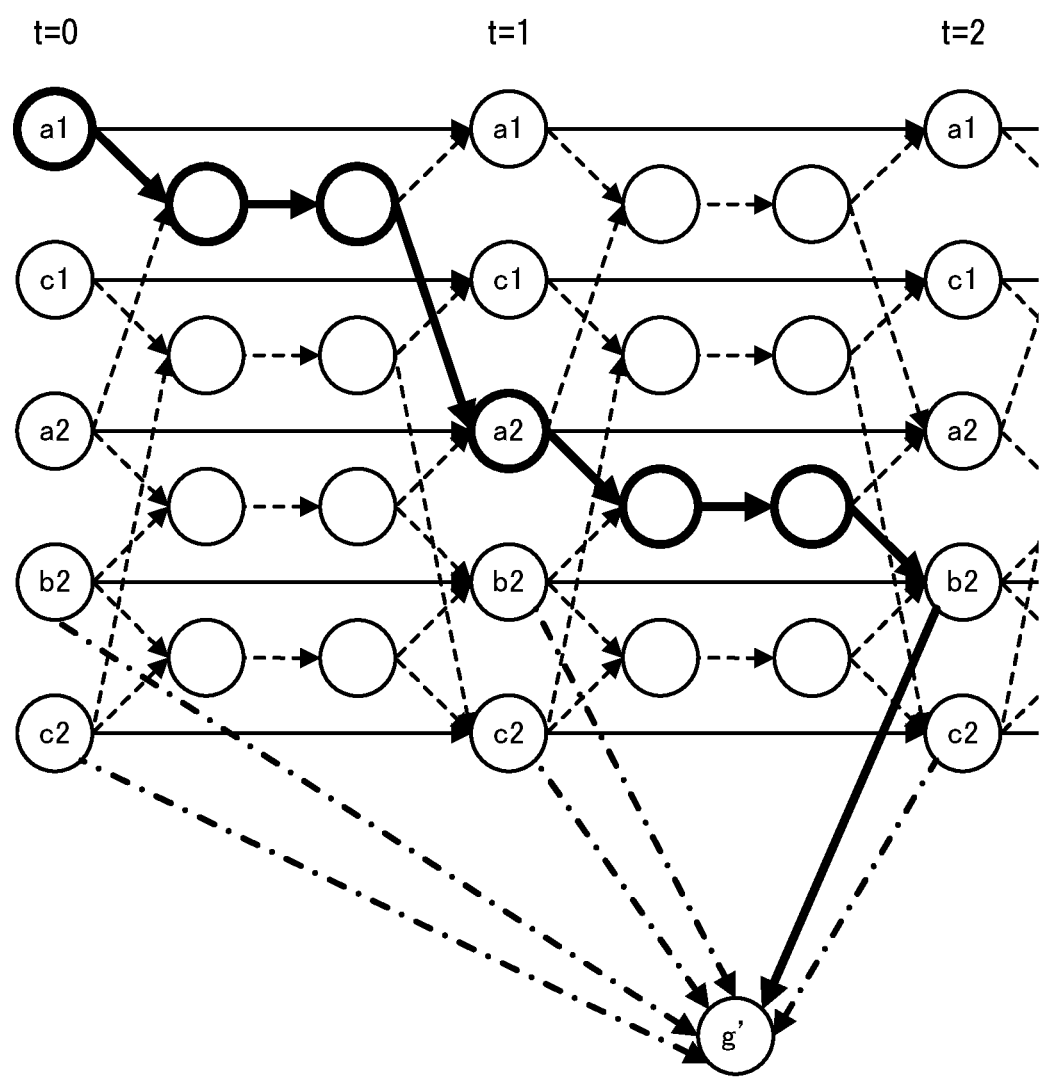
FIG. 13 is a diagram illustrating how the graph is created from the grid map.

Specifically, at the time t=0 in FIG. 13, if the moving object 20 is located at the node (a1), the route R={(a1,0)} is stored as the route information in the storage unit. Next, at the time t=1, if the moving object 20 moves to the node (a2), the route R={(a1,0), (a2,1)} is stored as the route information in the storage unit. Next, at the time t=2, if the moving object 20 moves to the node (b2), the route R={(a1,0), (a2,1), (b2,2)} is stored as the route information in the storage unit. Next, when the next node is the node (g'), the processing ends.

In this manner, by performing the minimum cost flow processing, the route shown in FIG. 13 (bold arrow lines) is generated. In other words, due to the minimum cost flow processing being used, the route for which the total of the distances is shortest can be obtained when the moving object 20 moves to the lay-by area.

Subsequently, the re-planning unit 3 selects the moving objects 20 in a predetermined order, and re-plans the routes from the moving objects 20 to the target sites such that the routes found for using the search unit 2 do not collide with each other.

[Apparatus Operations]

Figure 14:
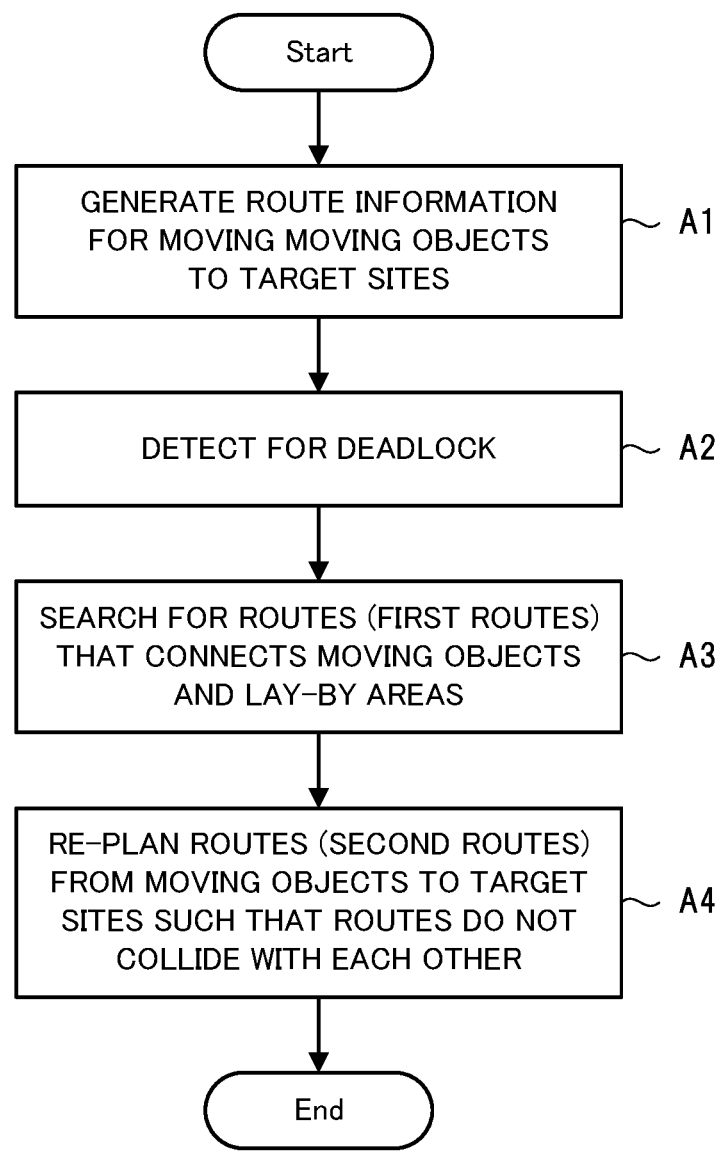
FIG. 14 is a diagram showing an example of operations of the route planning apparatus.

Next, the operations of the route planning apparatus according to the example embodiment of the invention will be described using FIG. 14. FIG. 14 is a diagram showing an example of the operations of the route planning apparatus. In the description below, FIG. 2 to FIG. 13 are referenced as appropriate. Also, in the example embodiment, the route planning method is implemented by operating the route planning apparatus. The description of the route planning method in the example embodiment will thus be given by describing the operations of the route planning apparatus as follows.

As shown in FIG. 14, first, the route planning unit 4 or 4' generates the route information for moving the moving objects 20 to the respective target sites corresponding to the moving objects 20 (step A1).

Specifically, in the systems (1) and (2), in step A1, the route planning unit 4 generates the route information for moving the moving objects 20 to the respective target sites using the positional information, the map information, the target site information, and the lay-by area information.

Alternatively, in the system (3), in step A1, the route planning unit 4' generates the route information for moving the moving object 20 provided with the route planning unit 4' to the target site using the positional information, the map information, the target site information, and the lay-by area information.

Next, the detection unit 5 performs deadlock detection using the map information and the positional information (step A2). Specifically, in the systems (1), (2), and (3), in step A2, if the plurality of moving objects 20 have been stationary in a predetermined area for a predetermined time period, the detection unit 5 determines that the moving objects 20 are in a deadlock.

Subsequently, upon detecting that one or more moving objects 20 are in a deadlock in the route plan of the moving objects 20, the search unit 2 searches for routes (first routes) that connect the moving objects 20 and the lay-by areas using any one of the above-described methods (A), (B), and (C) (step A3).

Specifically, in step A3, the search unit 2 uses the method (A) to select the moving object 20 located at the shortest distance from a lay-by area, and searches for the route (first route) using the selected moving object 20 and the lay-by area. For the details of the method (A), refer to the description of "Deadlock Avoidance through the method (A)" described above.

Alternatively, in step A3, the search unit 2 uses the method (B) to search for an unselected lay-by area that has not been selected by another moving object 20 and is located at the shortest distance from the moving object 20, generate a route from the moving object 20 to the selected lay-by area, and search for a route (first route) using the selected lay-by area and the moving object 20 that is located on the route and is closest to the selected lay-by area. For the details of the method (B), refer to the description of "Deadlock Avoidance through method (B)" described above.

Alternatively, in step A3, the search unit 2 uses the method (C) to search for a route (first route), for each moving object 20, using the minimum cost flow processing. For the details of the method (C), refer to the description of "Deadlock Avoidance through the method (C)" described above.

Subsequently, the re-planning unit 3 re-plans the routes (second routes) from the moving objects 20 to the target sites such that the routes (first routes) of the respective moving objects 20 found for in step A3 do not collide with each other (step A4). Specifically, upon detecting that first routes have been planned for all the moving objects 20, the re-planning unit 3 re-plans, for each moving object 20, the route from the moving object 20 to the target site and updates the previous route with the re-planned route.

[Effects of the Example Embodiment]

As mentioned above, according to the example embodiment, if a deadlock is detected, the route can be re-planned such that each moving object moves along the first route to the lay-by area and moves from the lay-by area to the target site, and thus even if there is a deadlock, the moving objects can avoid the deadlock and move to the respective target sites.

[Program]

A program according to the example embodiment of the invention need only be a program that causes a computer to execute steps A1 to A4 shown in FIG. 14. The route planning apparatus and the route planning method according to the example embodiment can be realized by this program being installed in the computer and executed.

Specifically, in the system (1), a processor of the computer on the moving object control apparatus 10 side performs processing while functioning as the search unit 2, the re-planning unit 3, the route planning unit 4, and the detection unit 5. Further, in the system (2), a processor of the computer on the moving object 20 side performs processing while functioning as the search unit 2, the re-planning unit 3, the route planning unit 4, and the detection unit 5. Further, in the system (3), a processor of the computer on the moving object control apparatus 10 side performs processing while functioning the search unit 2, the re-planning unit 3, and the detection unit 5, and the processor of the computer on the moving object 20 side performs processing while functioning as the route planning unit 4'.

Also, the program of the example embodiment may also be executed by a computer system constituted by a plurality of computers. In this case, for example, each computer may function as any of the search unit 2, the re-planning unit 3, the route planning unit 4, and the detection unit 5.

[Physical Configuration]

Figure 15:
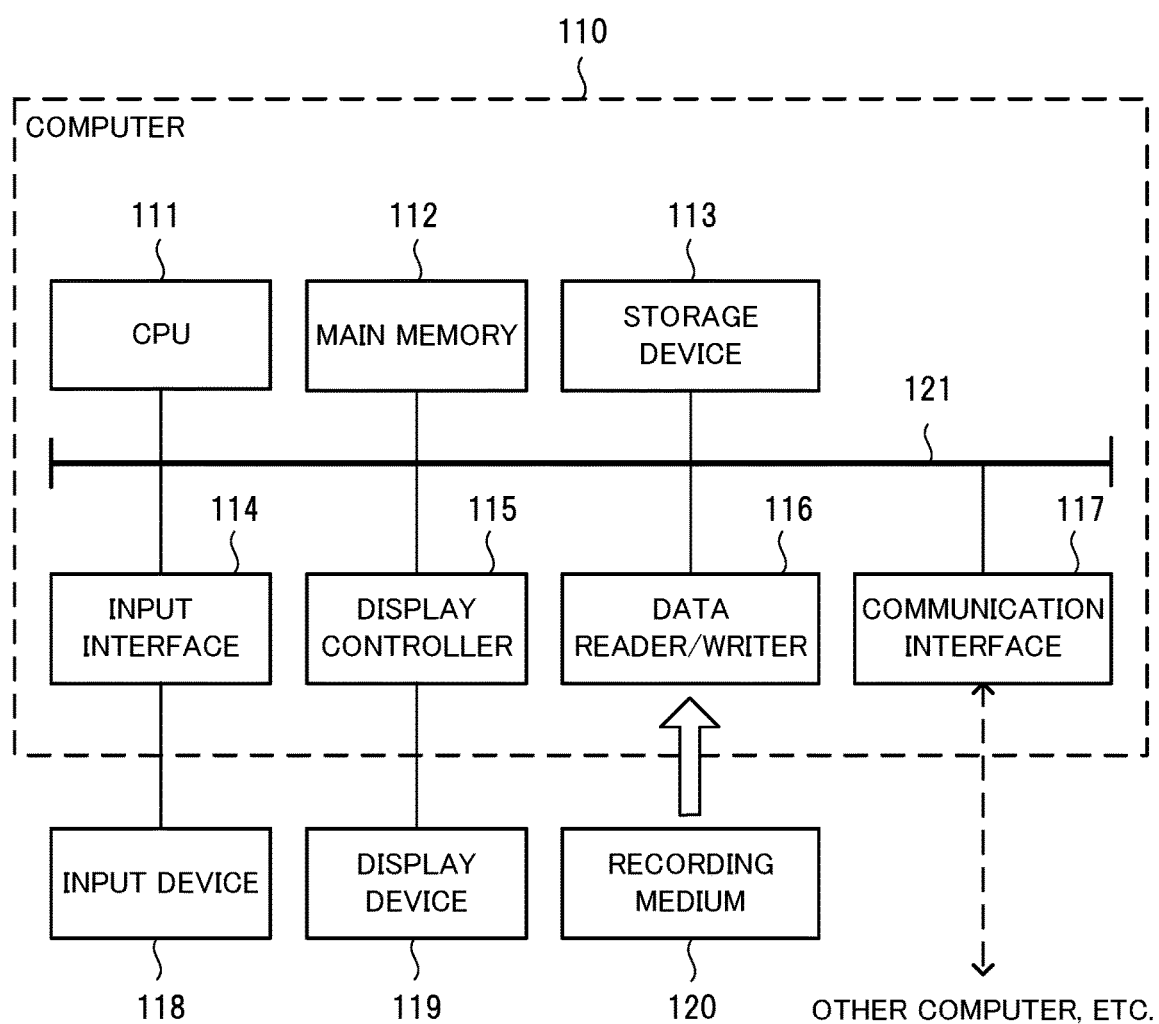
FIG. 15 is a diagram showing an example of a computer that realizes the route planning apparatus.

Here, a computer that realizes the route planning apparatus by executing a program of the example embodiment will be described using FIG. 15. FIG. 15 is a block diagram showing an example of a computer that realizes the route planning apparatus according to the example embodiment of the invention.

As shown in FIG. 15, a computer 110 includes a CPU (Central Processing Unit) 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting programs (code) in the example embodiment that are stored in the storage device 113 to the main memory 112, and executing these programs in a predetermined order. The main memory 112, typically, is a volatile storage device such as a DRAM (Dynamic Random Access Memory). Also, programs in the example embodiment are provided in a state of being stored in a computer-readable recording medium 120. Note that programs in the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display on the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the route planning apparatus 1 in the example embodiment is also realizable by using hardware that corresponds to the various parts, rather than by a computer on which programs are installed. Furthermore, the route planning apparatus 1 may be realized in part by programs, and the remaining portion may be realized by hardware.

[Supplementary Notes]

The following supplementary notes are further disclosed in relation to the above example embodiment. The example embodiments described above can be partially or wholly realized by supplementary notes 1 to 12 described below, although the invention is not limited to the following description.

(Supplementary Note 1)

A route planning apparatus including:

a search unit configured to, search for a first route that connects each moving object and a lay-by area, when a deadlock is detected in a route plan of one or more moving objects; and a re-planning unit configured to re-plan a second route from each moving object to a target site such that the first routes which have been respectively found for the moving objects do not collide with each other.

(Supplementary Note 2)

The route planning apparatus according to supplementary note 1, in which the search unit selects the moving object located at the shortest distance from the lay-by area, and searches for the first route using the selected moving object and the lay-by area.

(Supplementary Note 3)

The route planning apparatus according to supplementary note 1, in which the search unit selects an unselected lay-by area that is located at the shortest distance from the moving object and has not been selected by another moving object, generates a route from the moving object to the selected lay-by area, and searches for the first routes using the selected lay-by area and the moving object that is located on the route and is closest to the selected lay-by area.

(Supplementary Note 4)

The route planning apparatus according to supplementary note 1, in which the search unit searches for the first routes for the respective moving objects using minimum cost flow processing.

(Supplementary Note 5)

A route planning method including:

(a) a step of searching for, a first route that connects each moving object and a lay-by area, when a deadlock is detected in a route plan of one or more moving objects; and (b) a step of re-planning a second route from each moving object to a target site such that the first routes which have been respectively found for the moving objects do not collide with each other.

(Supplementary Note 6)

The route planning method according to supplementary note 5, in which in the (a) step, the moving object located at the shortest distance from the lay-by area is selected, and the first route is searched for using the selected moving object and the lay-by area.

(Supplementary Note 7)

The route planning method according to supplementary note 5, in which, in the (a) step, an unselected lay-by area that is located at the shortest distance from the moving object and has not been selected by another moving object is selected, a route from the moving object to the selected lay-by area is generated, and the first route is searched for using the selected lay-by area and the moving object that is located on the route and is closest to the selected lay-by area.

(Supplementary Note 8)

The route planning method according to supplementary note 5, in which, in the (a) step, the first routes for the respective moving objects are searched for using minimum cost flow processing.

(Supplementary Note 9)

A computer-readable recording medium that includes a program recorded thereon, the program including instructions that cause a computer to carry out:
(a) a step of searching for, a first route that connects each moving object and a lay-by area, when a deadlock is detected in a route plan of one or more moving objects; and
(b) a step of re-planning a second route from each moving object to a target site such that the first routes which have been respectively found for the moving objects do not collide with each other.

(Supplementary Note 10)

The computer-readable recording medium according to supplementary note 9, in which in the (a) step, the moving object located at the shortest distance from the lay-by area is selected, and the first route is searched for using the selected moving object and the lay-by area.

(Supplementary Note 11)

The computer-readable recording medium according to supplementary note 9, in which in the (a) step, an unselected lay-by area that is located at the shortest distance from the moving object and has not been selected by another moving object is selected, a route from the moving object to the selected lay-by area is generated, and the first route is searched for using the selected lay-by area and the moving object that is located on the route and is closest to the selected lay-by area.

(Supplementary Note 12)

The computer-readable recording medium according to supplementary note 9, in which in the (a) step, the first routes for the respective moving objects are searched for using minimum cost flow processing.

Although the invention of the present application has been described above with reference to an example embodiment, the invention is not limited to the foregoing example embodiment. Various modifications apparent to those skilled in the art can be made to the configurations and details of the invention of the present application within the scope of the invention.

INDUSTRIAL APPLICABILITY

As described above, according to the invention, even if there is a deadlock when moving moving objects to target sites according to a route plan, the deadlock can be avoided and the moving object can be moved to the target site. The invention is useful in a field where moving objects are required to be moved to target sites according to a route plan.

LIST OF REFERENCE SIGNS

1 Route planning apparatus
2 Search unit
3 Re-planning unit
4 Route planning unit
5 Detection unit
10 Moving object control apparatus
11 Communication unit
12 Instruction unit
20 Moving object
21 Communication unit
22 Sensor unit
23 Position estimation unit
24 Movement control unit
25 Movement unit
110 Computer
111 CPU
112 Main memory
113 Storage device
114 Input interface
115 Display controller
116 Data reader/writer
117 Communication interface
118 Input device
119 Display device
120 Storage medium
121 Bus

What is claimed is:

1. A route planning apparatus comprising:
one or more processors; and
one or more memories storing instructions executable by the one or more processors to:
search for a plurality of first routes that each connect a respective moving object of a plurality of moving objects and a corresponding lay-by area of a plurality of lay-by areas, in response to detecting a deadlock in a route plan of the plurality of moving objects, by, for each moving object as a selected moving object:
selecting the corresponding lay-by area as the lay-by area of the plurality of lay-by areas to which the selected moving object has a shortest distance and that has not been selected for any other moving object of the plurality of moving objects;
generating a route from the selected moving object to the corresponding lay-by area that has been selected for the selected moving object; and
searching for the first route that connects the selected moving object to the corresponding lay-by area that has been selected, that is located on the route, and that is closest to the corresponding lay-by area that has been selected; and
to plan a second route from each moving object to a target site such that the first routes do not collide with each other.

2. The route planning apparatus according to claim 1, wherein the instructions are executable by the one or more processor to search for the first route using minimum cost flow processing.

3. A route planning method comprising:
searching, by a processor, for a plurality of first routes that each connect a respective moving object of a plurality of moving objects and a corresponding lay-by area of a plurality of lay-by areas, in response to detecting a deadlock in a route plan of the plurality of objects more moving objects, by, for each moving object as a selected moving object;
selecting the corresponding lay-by area as the lay-by area of the plurality of lay-by areas to which the selected moving object has a shortest distance and that has not been selected for any other moving object of the plurality of moving objects;

generating a route from the selected moving object to the corresponding lay-by area that has been selected for the selected moving object; and searching for the first route that connects the selected moving object to the corresponding lay-by area that has been selected, that is located on the route, and that is closest to the corresponding lay-by area that has been selected; and planning, by the processor, a second route from each moving object to a target site such that the first routes do not collide with each other.

4. The route planning method according to claim 3, wherein the first routes are searched for using minimum cost flow processing.

5. A non-transitory computer-readable recording medium that includes a program recorded thereon, the program including instructions that when executed by a computer cause the computer to perform:

searching, by a processor, for a plurality of first routes that each connect a respective moving object of a plurality of moving objects and a corresponding lay-by area of a plurality of lay-by areas, in response to detecting a deadlock in a route plan of the plurality of objects more moving objects, by, for each moving object as a selected moving object;

selecting the corresponding lay-by area as the lay-by area of the plurality of lay-by areas to which the selected moving object has a shortest distance and that has not been selected for any other moving object of the plurality of moving objects;

generating a route from the selected moving object to the corresponding lay-by area that has been selected for the selected moving object; and searching for the first route that connects the selected moving object to the corresponding lay-by area that has been selected, that is located on the route, and that is closest to the corresponding lay-by area that has been selected; and planning, by the processor, a second route from each moving object to a target site such that the first routes do not collide with each other.

6. The non-transitory computer-readable recording medium according to claim 5, wherein the first routes are searched for using minimum cost flow processing.

7. The route planning apparatus according to claim 1, further comprising:

a sensor configured to detect a state of at least one of the plurality of moving objects, target objects, signs assisting movement of the plurality of moving objects, and obstacles on the routes.

8. The route planning apparatus according to claim 1, wherein the instructions are executable by the processor to further:

cause each moving object to move to at least one of the target site and the corresponding lay-by area that has been selected for the moving object.

* * * * *